United States Patent
Copeland

(10) Patent No.: US 10,674,735 B1
(45) Date of Patent: Jun. 9, 2020

(54) CRIMPED AND MOLDABLE PIE BAKING STRIP

(71) Applicant: Charlotte Marie Copeland, Martinez, CA (US)

(72) Inventor: Charlotte Marie Copeland, Martinez, CA (US)

(*) Notice: Subject to any disclaimer, the term of this patent is extended or adjusted under 35 U.S.C. 154(b) by 0 days.

(21) Appl. No.: 16/191,222

(22) Filed: Nov. 14, 2018

(51) Int. Cl.
*A47J 43/00* (2006.01)
*A21B 3/13* (2006.01)

(52) U.S. Cl.
CPC .............. *A21B 3/135* (2013.01); *A21B 3/131* (2013.01)

(58) Field of Classification Search
CPC . A47J 43/20; A21B 3/13; A21B 3/135; A21B 3/131
See application file for complete search history.

(56) References Cited

U.S. PATENT DOCUMENTS

| | | | | |
|---|---|---|---|---|
| 2,222,512 A | * | 11/1940 | Moyen | A21B 3/137 220/4.03 |
| 2,257,408 A | * | 9/1941 | Alexander | A47J 43/20 99/433 |
| 2,784,664 A | * | 3/1957 | Tippel | A47J 37/00 99/433 |
| 3,728,957 A | * | 4/1973 | Polus | A21B 3/13 126/39 M |
| 4,080,884 A | * | 3/1978 | Terrell | A21B 3/13 99/433 |
| D333,590 S | * | 3/1993 | Harris | D7/387 |
| 5,456,162 A | * | 10/1995 | Polizzotto | A21B 3/135 220/4.03 |
| 6,026,739 A | * | 2/2000 | Dernoga | A21B 3/135 99/433 |

* cited by examiner

*Primary Examiner* — Dana Ross
*Assistant Examiner* — Lawrence H Samuels

(57) ABSTRACT

A crimped strip of thin sheet metal (such as aluminum foil) or metal composite material that surrounds a pie crust from the body of the pie to the under edge of the pie crust. and protects it from burning or over-browning while cooking. The two outer edges of the strips width are crimped so that the final product, when viewed from the side, assumes a circular appearance. The crimped and moldable strip accommodates a variety of pie diameters and pie crust heights and designs because of its easily adjustable and moldable qualities. The crimped and moldable pie baking strip is malleable, the length can be cut to size, and the ends can be folded together to secure its position. It is designed primarily as a single use item to address an unmet market need.

2 Claims, 1 Drawing Sheet

CRIMPED AND MOLDABLE PIE BAKING STRIP

BACKGROUND OF THE INVENTION

1. Scope of Invention

This invention relates generally to pie baking, and more particularly to a single-use, disposable molded foil-like, lightweight roll or prepackaged, pre-cut strips for protecting all aspects and angles of a pie crust during baking. The crimped, moldable pie baking strip may be reused, however the quantity of strip material provided in the product packaging and economy of the material would make that unnecessary. The single-use strip is designed for convenience and ease of use. Therefore, the invention does not require cleaning following use and addresses an unmet market need as described:

The crimped, moldable pie baking strip meets the needs of a large group of bakers that resort to the "do it yourself" approach in creating a strip of foil that unsuccessfully and inconsistently covers the crust when cooking. It easily becomes dislodged from the crust while the pie is baking. A "do it yourself" crust protector is time consuming to create, especially if the baker is making multiple pies. This group of bakers remains unsatisfied by the current offering of reusable crust protectors and shields, whose performance is unreliable due to the variables of heat conduction and shape.

The problem of overbaking and burning or charring the outer edge of a pie crust is well known. This occurs because the pie crust edge is very thin compared to the overall thickness of the main portion of the pie.
Numerous prior art devices have addressed this problem:
Prior Art, Recent

| U.S. Patent Documents, Recent | | |
|---|---|---|
| D408215 | April 1999 | Williams |
| D384857 | October 1997 | Beule |
| D384550 | October 1997 | Dernoga |
| D369941 | May 1996 | Romina |
| D364533 | October 1995 | Brophy |
| D362995 | October 1995 | Marsico |
| 5456162 | October 1995 | Polizzotto |
| D345672 | April 1994 | Silva |
| D343548 | January 1994 | Helfer |
| D533590 | March 1993 | Hurico |
| D303908 | October 1984 | Anderson |

One such invention is disclosed in U.S. Pat. No. D408,215 by Williams in which a pie crust shield is described. The device described by Williams is a molded, reusable circular pie crust shield which is placed in a single piece on top of the pie prior to baking. It includes two phalanges. It does not allow for adjustment depending of various pie diameters.

Another invention is disclosed in U.S. Pat. No. D384,857 by Beule, which describes a round, pre-formed heavy ring of material that is placed over the crust while baking. It does not address the underside of the crust, which can over-brown if not covered during baking.

Another invention addresses the need for a pie cover edge protector, as outlined in U.S. Pat. No. D384,550 by Dernoga, which describes a solid ring of material which covers the top and sides of the crust. The size is not adjustable. As the previous design, this design does not address the underside of the crust.

Ramina describes and invention referred to as a pie ring, U.S. Pat. No. D369,941. The invention consists of a solid ring of material with four tabs placed at 45-degree points around the ring, designed to provide easy placement onto and easy removal from the pie crust.

Another such invention, U.S. Pat. No. D364,533 is described by Brophy, pie crust shield. The device is solid construction with a wide extension that covers the top of the pie crust. The invention has a long lip that extends over the edge of the pie crust. It also has a cross-piece that is intended to assist with the placement and removal of the pie crust shield.

U.S. Pat. No. D362,995 by Marsico, describes a one-piece invention that is placed onto the top of the pie crust and extends over the body of the pie. It is placed over the pie using two small handles, and has a wide and angled section that protects the side of the pie crust. The device covers an area that far exceeds the top, and side of the pie crust.

Polizzotto describes a pie crust and baking shield in U.S. Pat. No. 5,456,162. The invention outlined is a preformed, reusable strip or circle that has a locking mechanism to join the two ends of the device to preserve the circular shape. The device balances on the top of the crust to protect it during baking.

Another such device is described in U.S. Pat. No. D345, 672, Silva, pie crust protector. The device is a pre-formed ring that has six clip-like projections that are designed to hold the ring onto the underside of the crust, balancing on the side of the pie plate.

U.S. Pat. No. D343,548, Helfer, also describes a pie crust protector. It is a single molded device with multiple holes placed within the material to allow steam to escape while the pie bakes. There is a large tab molded into the material that allows for easy placement and removal of the device.

Another device described in U.S. Pat. No. D333,590, Harris, pie crust edge cover. The device appears corrugated and extends over the top of the crust onto the body of the pie. It has a small edge that protects the edge of the crust, being placed at approximately a 90-degree angle from the top of the device.

Another such invention, U.S. Pat. No. D303,908, pie crust shield, Anderson. The invention is a single molded device with a top and a small side that is placed on top of the pie crust and protects the edge of the crust. The design includes a waveform pattern on opposite sides of the device for a distinctive design element.

| 3. Prior Art, Older | | |
|---|---|---|
| 2784664 | March 1957 | Tippel |
| 3580484 | May 1971 | Schneider |
| 3951053 | April 1976 | Kirkpatrick |

One such device is disclosed in U.S. Pat. No. 3,728,957 wherein Polus has invented a baking shield which extends peripherally around the pie pan and has an outer member of flexible foil sheeting which is folded around the outer edge of the pie pan to protect overbaking the pie crust periphery. The novel invention described by Copeland is not attached to the pie pan.

Another pie crust guard was invented by Alexander as set forth in U.S. Pat. No. 2,257,408 directed to a transversely split ring member of continuous nature wherein the overlapping split ends supposedly accommodate various pie pan diameters. However, because of the continuous nature of the inwardly extending flange, precise fitting onto any range of pie pan diameters is not accomplished.

Houston, in U.S. Pat. No. 1,834,402 teaches a pie plate attachment consisting of a metal ring adapted to be removably mounted on the rim of the pie plate. The metal ring comprises a continuous strip of metal bent into a circular form and having its ends joined to form a complete ring, thus rendering the device non-adjustable and including additional structural features distinguished from the present invention.

Another pie crust shield is disclosed in U.S. Pat. No. 4,080,884 by Terrell teaching a protective shield comprising at least four separate flexible arcuate segments which slip over the edge of the pie tin to prevent the edge of the crust from overcooking.

Other devices which generally address this same problem are disclosed in the following U.S. Patents:

Blynt U.S. Pat. No. 835,212 Scott U.S. Pat. No. 1,375,539 Sabin U.S. Pat. No. 843,109 McLaughlin U.S. Pat. No. 1,180,782

The present invention provides a crimped and moldable pie baking strip, protecting the outer edge portion of a wide range of standard pie crust diameters and is easily, flexibly formable to the appropriate selected pie diameter and height of the pie crust. The malleable nature of the invention allows the user to exactly conform to each individual pie crust diameter so that the outer edge of the pie crust is fully and continuously protected, from the under edge of the pie plate to the main portion of the pie. It can easily be shaped above a pie filling that does not utilize a second pie crust to top the pie, so that a cream filling is left undisturbed.

This novel invention provides a highly malleable, easily placed, easily removed, single use, disposable pie baking and cooking accessory that is designed to be discarded after one placement.

SUMMARY OF THE INVENTION

It may be apparent that a novel and useful single-use, disposable, crimped, pre-molded and easily shaped and cut pie baking strip has been described. It is therefore an object of the present invention to provide a single use, disposable, crimped and moldable pie baking strip which allows the user to easily apply and customize by hand shaping to an unbaked pie crust, and easily remove or reapply the strip during any point of the baking process.

Another object of the present invention is to provide a crimped, moldable pie baking strip which is simple and economical to manufacture following initial tooling costs, if required.

Yet another object of the present invention is to provide a single use, crimped, moldable pie baking strip that is discarded after a single use, making it ideal for both home and commercial use.

The invention possesses other objects and advantages especially as concerns particular characteristics and features thereof which will become apparent as the specification continues.

For a better understanding of the invention references made to the following detailed description of the preferred embodiments thereof which should be taken in conjunction with the herein above described drawings.

DETAILED DESCRIPTION OF THE PREFERRED EMBODIMENTS

Various aspects of the present invention will evolve from the following detailed description of the preferred embodiments which should be viewed with the prior described drawings.

Figure 1:
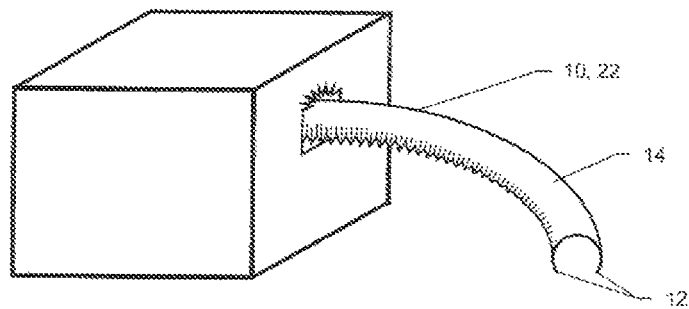
FIG. 1 is a side elevational view of the strip, shown in a packaging example for illustrative purposes.
Figure 2:
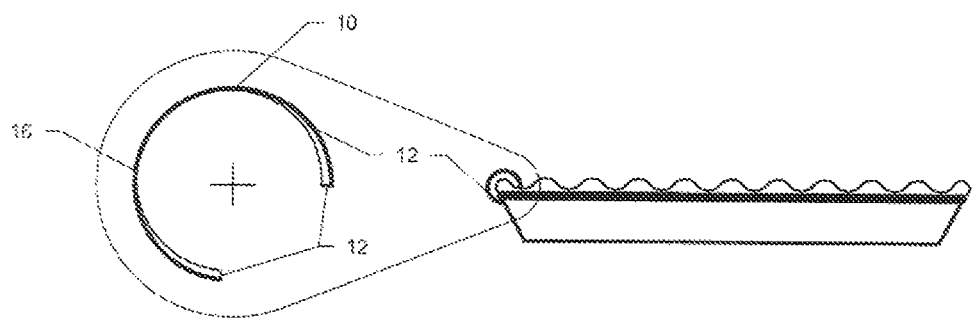
FIG. 2 showing the semi-circular shape of the invention is a front view of the strip, FIG. 3 demonstrates how the strip is easily applied to the pie crust
Figure 3:
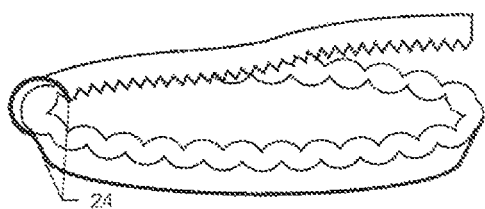
Figure 4:
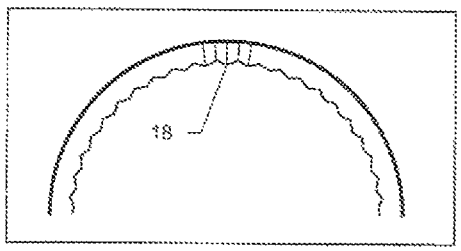
FIG. 4 is a top elevational view of the strip demonstrating how the front and back ends of the present invention are folded upon themselves to easily encircle a pie of any diameter. There are no hooks are attachments, as the user simply pinches the ends together with their fingers if desired.

The invention as a whole is shown in the drawings by FIGS. 1 and 3, respectively. The strip structure 10 is particularly suited for application to a round pie shape, as depicted in FIGS. 3 and 4. Structures 10 and 16 demonstrate the larger diameter of the central portion of the strip. With reference to FIGS. 1 and 2, it may be observed that strip structures 12, 20 and 24 depict the narrower diameter of the crimped edges of the strip compared to the central portion. Character 22 in FIG. 1 illustrates the circular shape of the strip when removed from the packaging and viewed from the side. It should be understood that the strip is completely malleable and adjustable, accommodating a wide variety of crust configurations. Character 24 in FIG. 3 illustrates that the two crimped edges of the strip lie directly opposite of each other, making the application of the strip easy and efficient to completely surround and protect the pie crust during baking. Just as with aluminum foil, the length of the strip can be cut to fit any pie diameter.

FIG. 2 illustrates the semi-circular shape of the strip when viewed from the front, before it is removed from the packaging, further clarified by character 12. Character 18, FIG. 4 depicts the ends of the strip folded or pressed together to completely and easily enclose the pie crust. It is as easily and quickly removed from or reapplied to the crust at any point in the baking process.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A single use, disposable, crimped and moldable pie baking strip comprised of:
   a. a continuous length of foil of several linear feet that can be cut to exact size strips or pre-cut strips of foil up to 36 inches, manufactured of easily malleable metal, composite or synthetic material that can be cut to exact size strips with a simple scissor;
   b. the continuous length of foil or each of the pre-cut strips has a width of ½ to 3 inches when laid flat to fit a variety of pie crust designs;
   c. the continuous length of foil or each of the pre-cut strips is of consistent width;
   d. the continuous length of foil or each of the pre-cut strips is approximately 0.005 mm to 1.0 mm in material thickness;
   e. the continuous length of foil or each of the pre-cut strips is dispensed from a packaging to form a loosely coiled circular shape when viewed from the top once outside the packaging;
   f. the continuous length of foil or each of the pre-cut strips is crimped into a semi-circular or ovoid shape inside the packaging, the semi-circular or ovoid shape is visible when viewing the continuous length of foil or each of the pre-cut strips head on; and g. a front end and a back end of each of the cut exact-size strips of the continuous length of foil, or of each of the pre-cut strips can be easily pressed together or folded upon themselves to form a continuous and complete cover around an entire pie crust.

2. The single use, crimped, moldable pie baking strip of claim 1, wherein the crimped semi-circular or ovoid shape of each of the cut exact-size strips of the continuous length of foil, or each of the pre-cut strips, can be hand molded or reshaped to fit above and below edges of the entire pie crust, surrounding the said entire pie crust, wherein a. an outer crimped edge of each of the cut exact-size strips of the continuous length of foil or each of the pre-cut strips can be pressed in place to lie essentially flat or balanced against an under-edge of a pie pan or plate to ensure placement; and b. an inner crimped edge of each of the cut exact-size strips of the continuous length of foil or each of the pre-cut strips can be easily molded or shaped by a user so as to cover the edges of the entire pie crust and not to disturb contents of the entire pie crust when baking.

* * * * *